Nov. 28, 1961          G. F. SKALA          3,010,308
HIGH EXPANSION RATIO CONDENSATION NUCLEI APPARATUS
Filed Dec. 6, 1957
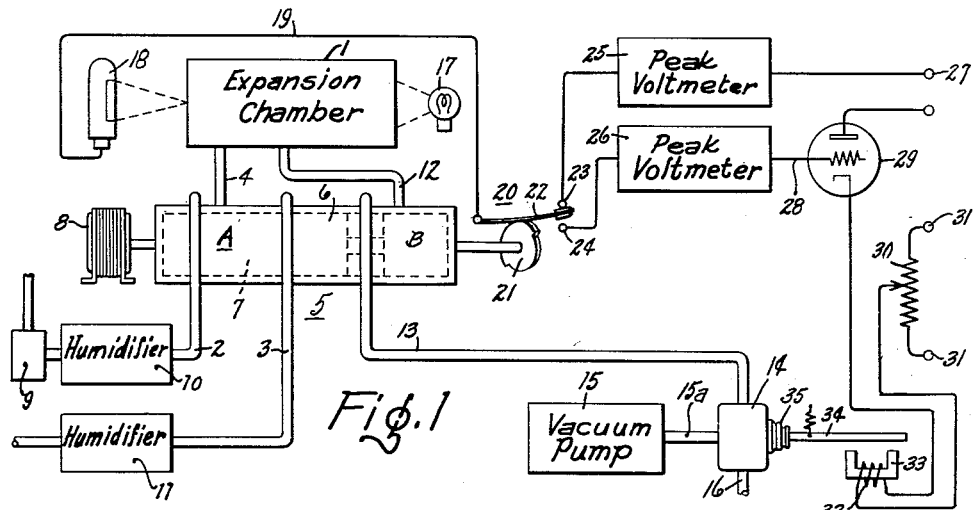
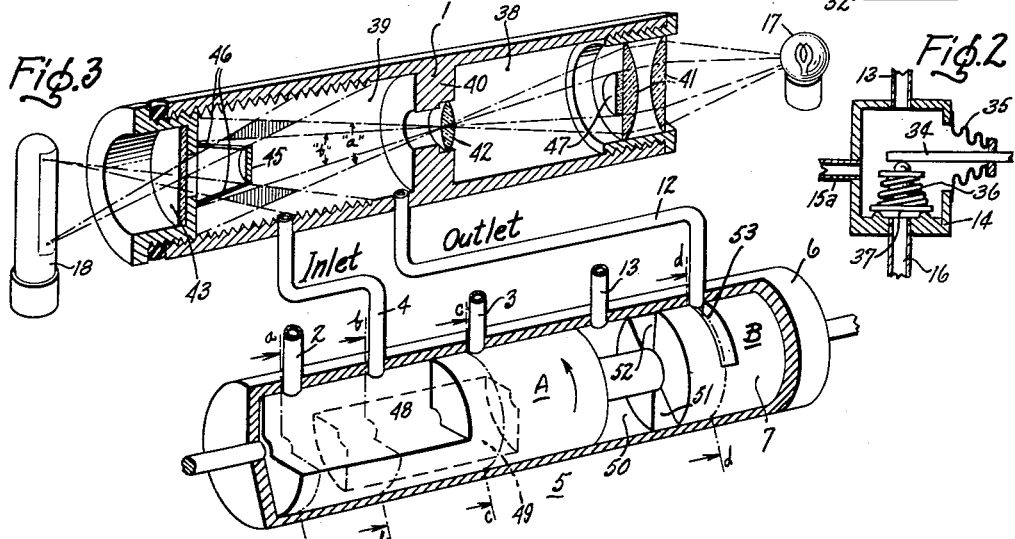
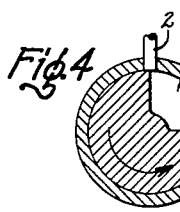 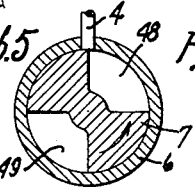 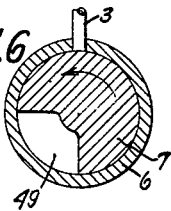 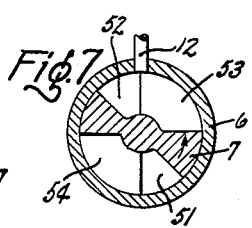
Fig.8
| | FLUSH | FILL | DWELL | EXPAND | FLUSH | FILL | DWELL | EXPAND |
|---|---|---|---|---|---|---|---|---|
| A | OPEN TO 2 | OPEN TO 2 | CLOSED | CLOSED | OPEN TO 3 | OPEN TO 3 | CLOSED | CLOSED |
| B | PART OPEN SLOT 53 | PART OPEN SLOT 53 | CLOSED | OPEN 52 | PART OPEN SLOT 54 | PART OPEN SLOT 54 | CLOSED | OPEN 51 |
Inventor:
George F. Skala,
by Merton D. Morse
His Attorney

United States Patent Office 3,010,308
Patented Nov. 28, 1961

3,010,308
HIGH EXPANSION RATIO CONDENSATION NUCLEI APPARATUS
George F. Skala, Schenectady, N.Y., assignor to General Electric Company, a corporation of New York
Filed Dec. 6, 1957, Ser. No. 701,267
6 Claims. (Cl. 73—28)

The instant invention relates to an apparatus for measuring small airborne particulate matter and, more particularly, those of the type known as condensation nuclei.

One of the objects of this invention is to provide an apparatus for measuring condensation nuclei wherein the nuclei bearing samples are subjected to expansion pressure ratios sufficiently high to produce supersaturations just below those producing spontaneous condensation.

In the detection and measuring of nuclei it is customary to subject humidified nuclei bearing gaseous samples to a known expansion inducing adiabatic cooling. The cooling produces a supersaturated condition and excess water deposits around the existing nuclei to form small droplets, the number of which are a measure of the nuclei concentration.

In detecting and measuring condensation nuclei it is often desirable to form, if possible, water droplets about the more minute nuclei in the size spectrum. In order to do so it is necessary to control the degree of supersaturation since it is well known that a given degree of supersaturation is required to start the growth of a water drop on a particle of any given size. These relations are developed fully in an article by N. N. Das Guptia and S. K. Ghosh in Reviews of Modern Physics, vol. 18, No. 2, April 1946, which article clearly establishes that the smaller the nuclei to be detected the greater the supersaturation necessary to initiate condensation.

From the teachings of H. Landsberg, Atmospheric Condensation Nuclei, Ergebnis Kosmischen Physik, 3 (1938), it is also known that at certain extremely high supersaturation levels a condition known as "spontaneous condensation" exists wherein condensation takes place about water molecules in the carrying medium even in the absence of condensation nuclei to act as droplet centers. The above article by Landsberg has pointed out that this "spontaneous condensation" condition occurs around supersaturation levels of approximately 800%. Hence, to achieve optimum functioning it is desirable to utilize expansion pressures which produce supersaturations just below this "spontaneous condensation" condition since enhanced operation would result. Thus, for example, one sees the smaller particles and it becomes feasible to discriminate against the older, larger, nuclei population accentuating only the smaller nuclei. In addition, better signal-to-noise ratios are achieved, as well as other advantages and desirable results.

However, no matter how desirable this type of operation may be, it has been found that stable operation in this range is extremely difficult because of the close control of pressure required in order to establish the proper expansion ratios and hence the proper supersaturation level. That is, the exact pressure expansion ratio corresponding to "spontaneous condensation" supersaturation varies with ambient pressure and temperature and, hence, extremely close control of pressure is required to produce accurate, reproducible results. Consequently, to achieve the desired results it becomes necessary to adjust the expansion pressure ratio continuously and automatically to compensate for ambient pressure and temperature as well as any other variations.

It is a further object of this invention, therefore, to provide a high expansion ratio condensation nuclei apparatus which is stable in operation.

Another object of this invention is to provide a high expansion ratio condensation nuclei apparatus which is self-compensating.

An additional object of this invention is to provide a high expansion ratio condensation nuclei apparatus with close and accurate control of the expansion pressures.

Yet another object of this invention is to provide a high expansion ratio condensation nuclei apparatus which is ambient pressure and temperature compensated.

Still another object of this invention is to provide a high expansion ratio condensation nuclei apparatus which provides continuous and automatic adjustment of the expansion pressure to compensate for ambient conditions.

Other objects and advantages of the invention will become apparent as the description of the invention proceeds.

The term "condensation nuclei" as utilized in this specification, is a generic term given to small airborne particulate matter which is characterized by the fact that the particles serve as the nucleus on which a fluid, such as water for example, will condense to form droplet clouds. Such condensation nuclei encompass microscopic and submicroscopic particles, lying in a size range extending from approximately $1 \times 10^{-4}$ cm. radius to $1 \times 10^{-8}$ cm. radius, although the most impartant numerically encompasses particles ranging in size from $2.5 \times 10^{-7}$ cm. to $1 \times 10^{-5}$ cm. radius.

To carry out the objects of this invention, nuclei-bearing and nuclei-free gaseous samples are successively subjected to a controlled adiabatic expansion which produces supersaturation levels just below those necessary for "spontaneous condensation." The output of the condensation nuclei apparatus, whenever nuclei-free samples are expanded, is utilized to control the expansion pressure. In the event that the expansion pressure ratio is correct for the ambient conditions, the output of the measuring apparatus will be substantially close to zero since the operating conditions are such as not to produce "spontaneous condensation" and the sample is nuclei-free and the expansion pressure is not varied. If, however, ambient temperature and pressure conditions change so that the expansion pressure produces supersaturations which induce "spontaneous condensation," an output is produced which is due to droplets formed by "spontaneous condensation." This output is then utilized to reduce the expansion pressure ratio. Thus, the system is continuously self-correcting and the output of the condensation nuclei apparatus for the nuclei-free gaseous sample is maintained near zero, keeping the expansion pressure ratio just below that required for spontaneous condensation.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawing in which:

FIGURE 1 shows, partially in block diagram form, the novel apparatus of the invention;

FIGURE 2 shows in cross section the pressure regulating valve means of FIGURE 1;

FIGURE 3 is a perspective view, partially in cross section, of the expansion chamber and valve assembly of FIGURE 1;

FIGURES 4–7 are sections taken along the lines a—a through d—d of FIGURE 3; and

FIGURE 8 is a chart showing the relative positions of the valve for a complete operational cycle.

Referring now to FIGURE 1, there is shown a preferred embodiment of a condensation nuclei measuring device illustrating the principles of the instant invention. There is provided a chamber defining means 1 having gaseous samples periodically introduced thereto from a pair of conduits 2 and 3 through an inlet conduit 4 and a rotary valve means 5.

The valve assembly 5 comprises a stator 6 and a rotor 7 coupled to a suitable driving means such as the motor 8. The valve assembly 5 is constituted of two portions A and B, the first of which, by virtue of recessed portions on the rotor 7, alternately connects conduits 2 and 3 to chamber 1, whereas portion B periodically connects the chamber to a source of regulated lower pressure to expand the gaseous samples.

A filter means 9 is connected into conduit 2 to remove all nuclei, vapors and gases from the gaseous sample. The filter 9 may contain glasswool, or other similar fibrous element for removing nuclei, and a charcoal element for removing gases and vapors present in the sample. A humidifier 10, which may be of the bubbler or any other suitable type, is provided to bring the now nuclei-free gaseous sample to 100% relative humidity prior to their introduction into the chamber 1.

The conduit 3, on the other hand, contains merely a humidifying element 11 similar to the one in conduit 2 and, as a consequence, these gaseous samples are nuclei-bearing. Thus, by alternately connecting the input conduits 2 and 3 nuclei-free and nuclei-bearing samples at 100% relative humidity are alternately introduced into the chamber.

A means, such as the vacuum pump 15, to reduce the pressure in the chamber 1 periodically to expand both the nuclei-free and nuclei-bearing samples is coupled to the chamber through conduit 12, portion B of the valve assembly 5, output conduit 13, and an electromechanical, adjustable, pressure-regulating valve means 14. Vacuum pump 15, or the like, provides the lower pressure and is connected to the pressure-regulating valve 14 through a conduit 15a. The regulating valve 14 has a bleeder conduit 16 representing the ambient pressure level connected to it in order to provide a reference level for the pressure-regulating function. The valve 14 provides a fixed pressure differential with respect to ambient to be applied to the samples which pressure differential may be adjusted, in a manner presently to be described, by means of an armature member 34 extending into the valve body through a flexible bellows seal illustrated at 35. The precise construction and manner of operation of the adjustable valve assembly 14 will be discussed in detail later with reference to FIGURE 2. Suffice it to say at this time, however, that the valve 14 establishes a fixed pressure differential with respect to ambient pressure, which differential may be varied by manipulation by the armature 34.

There is provided a means to vary the pressure controlled expansion to adjust continuously for ambient temperature and pressure conditions to maintain the supersaturation levels just below those inducing "spontaneous condensation." This is achieved by utilizing the nuclei-free samples to produce an electrical output which may be compared to a reference and utilized to control the pressure-regulating valve 14.

To this end the chamber 1 is traversed by a beam of radiant energy produced by a source of radiant energy 17 such as an incandescent lamp or the like, adjacent to one end of the chamber and transmitted by an optical system within the chamber 1 onto a radiation sensitive device 18 which, for example, may be phototube or photomultiplier, to produce an electrical output proportional to the droplet cloud density.

The electrical output voltage from the radiation sensitive device 18 is coupled by means of any suitable lead 19 to a cam actuated switch assembly 20 which operates in synchronism with the valve assembly 5 to apply the output signals representative of the nuclei-free and nuclei-bearing gaseous samples, respectively, to separate measuring means. The switch assembly 20 includes a cam 21 driven in synchronism with the valve rotor 7 which urges a resilient contact supporting armature 22 alternately against a pair of contact elements 23 and 24. The cam 21 and its associated armature 22 are constructed so that lead 19 is connected to contact 23 when conduit 3 is connected to the expansion chamber 1 and to contact 24 when the input conduit 2 is so connected.

The contacts 23 and 24 are connected respectively to a measuring means such as a pair of peak reading voltmeters 25 and 26 of any well known construction to provide a measure of the amplitude of the output signals from the radiation sensitive device 18. Peak reading voltmeter 25 is connected, in turn, to an output terminal 27 which may be connected to a meter or a recording instrument to provide an indication and measure of the droplet cloud density of the nuclei bearing samples and, hence, of the number of nuclei present therein.

The peak reading voltmeter 26, on the other hand, is connected to a comparison and control circuit 28 which actuates the pressure-regulating valve 14 to adjust continually for ambient pressure and temperature variations. The output of the peak reading voltmeter 26 is connected to the control grid of a cathode follower connected triode vacuum tube 29. The cathode of the triode 29 is connected in series with a solenoid coil 32 mounted in flux exchange relationship on a U-shaped core member 33 and a portion of a reference voltage potentiometer 30 connected across a source of reference voltage. The current flow through the solenoid coil 32 and, hence, the position of the armature 34, is controlled by the potential difference at the cathode of the triode 29 and the movable tap on the reference voltage potentiometer 30.

Thus, by continuously comparing the reference voltage from the potentiometer 30 with the output of the peak reading voltmeter 26 it is possible to control the pressure differential applied to the expansion chamber 1 so that supersautration levels just below those producing "spontaneous condensation" may be achieved. That is, should the ambient temperature and pressure level change in a direction so that the existing pressure differential induces spontaneous condensation, droplet clouds form even in the absence of nuclei and the output of the radiation sensitive device 18 and, hence, the peak voltmeter 26, changes in magnitude and in turn varies the current flow through the solenoid 32. The valve controlling armature 34 moves, in response to the changed magnetic field of coil 32 and core 33, to change the pressure differential applied to the chamber 1 through the valve 14.

The position of the movable tap on the potentiometer 30 may be adjusted in such a manner that a desired reference level is supplied and the system continually corrects for those temperature and pressure variations which tend to drive the system into the spontaneous condensation range.

It is to be understood that in the event the pressure differential applied to the chamber is such as to produce no "spontaneous condensation" there will still be some droplets formed since the filtering efficiency of filter 9 will not be 100% and hence a small output signal from radiation sensitive device 18. This background or noise signal may be compensated for in the output of peak voltmeter 25 and its attendant indicating instrument by appropriate calibration corrections, and may be utilized in the output of peak voltmeter 26 to manipulate control and comparison circuit 28 to reset the position of the armature 34 in the event the ambient pressure and temperature change so as to require a greater pressure differential to bring the system to the desired operating point.

FIGURE 2 illustrates a preferred embodiment of the pressure-regulating valve 14 which is continually adjusted to compensate for ambient variations in pressure and temperature. The pressure-regulating valve comprises a main valve body 14 having connected to the interior thereof the conduit 15a connected to the vacuum pump 15, the output conduit 13 connected to the valve assembly 5 and the chamber 1, and a bleeder conduit 16. The conduit 16 functions to bleed a gaseous medium such as air into the valve to reduce the pressure differential in the event this pressure differential exceeds a preset value determined by a spring biased member 37. That is, the gaseous medium in the conduit 16 acts against the spring biased disc or washer member 37 which seals off the conduit 16 from the interior of the valve 14. The amount of pressure extended by the spring member 36 against the disc 37 controls the pressure differential applied to the expansion chamber since should the pressure differential exceed the preset value the ambient pressure in the conduit 16 overcomes the spring pressure exerted against the disc 37 and air bleeds into the valve 14 until the pressure differential returns to the preset value.

The tension of the spring 36 may be adjusted by means of the armature 34 extending into the valve body 14 through a flexible bellows sealing and pivoting element 35 to vary the preset differential. Thus, movement of the armature element 34 increases or decreases the spring tension exerted against the disc 37 depending on the direction of its movement to control the pressure differential.

It is obvious, of course, though one embodiment of such an adjustable valve has been illustrated, that many different types of valves may be utilized as, for example, a motor driven one, other than the specific one illustrated, and the utilization of such other pressure-regulating adjustable valves still fall within the spirit and scope of the invention.

FIGURE 8 illustrates in chart form the relationship between portions A and B of valve assembly 5 and their respective conduits 2, 3 and 13 for one complete operational cycle. In the course of one such cycle the samples, one nuclei-free and one nuclei-bearing, are applied successively to the chamber in a sequence of operation broken up into four distinct portions denominated, for ease of explanation, as flush, fill, dwell, and expand. Thus, as shown in FIGURE 8, during the flush and fill portions both valve sections A and B are so positioned to permit communication between the expansion chamber 1 and conduits 2, 4, 12 and 13, permitting the first sample, which we shall assume for explanatory purposes to be nuclei-free, to flow into the expansion chamber while the previous sample is drawn out.

A short time later both valve portions A and B have rotated into position, during which communication between the expansion chamber 1 and conduits 2 and 13 is interrupted and the fresh nuclei-free sample in the chamber is permitted to dwell and come to thermal equilibrium.

Upon further rotation of the rotor 7 portion B of the valve assembly 5 again permits communication between conduit 13 and chamber 1 while portion A remains closed, thus applying regulated low pressure from the valve 14 and the vacuum pump 15 to the sample causing an adiabatic expansion. Simultaneously the cam 21 rotating in synchronism with the rotor 7 has moved the flexible armature 22 and, hence, the lead 19 against the contact 24 connecting it to the peak reading voltmeter 26. If the expansion ratio applied to the chamber 1 through the valve assembly 5 is correct for ambient temperature and pressure conditions the degree of supersaturation produced in the nuclei-free sample in the chamber 1 is just below that necessary for spontaneous condensation and hence substantially no output voltage, other than background due to imperfect filtering, is produced by the radiation sensitive device 18 and, consequently, control circuit 28 produces a current flow through the solenoid 32 of sufficient magnitude to retain the armature element 34 in its position.

If, on the other hand, ambient temperature and pressure conditions have varied sufficiently to make the existing preset differential of the valve assembly 14 too high, a droplet cloud due to "spontaneous condensation" not nuclei is produced in the chamber. Hence, an output voltage proportional to the cloud density is produced and applied to the peak reading voltmeter 26 changing the current flow in the solenoid 32 sufficiently to move the armature element 34 toward the U-shaped core member 33. This movement of the armature 34 pivoted about the flexible bellows 35 moves the armature 34 within the valve assembly in an upward direction reducing the spring pressure applied against the disc 37 by the spring 36. Hence, the preset pressure differential to the chamber 1 is reduced sufficiently to compensate for the ambient variations and reduce the supersaturation below that value which causes "spontaneous condensation."

With the expansion of the nuclei-free samples the rotor 7 has rotated through 180° or one-half of the rotational cycle. During the remaining 180° a nuclei-bearing sample is introduced and acted upon to produce an indication of the number of nuclei. It can be seen, however, that when this nuclei-bearing sample is brought into the instrument, the expansion pressure ratio has been adjusted to compensate for ambient conditions while yet permitting the use of high expansion ratios. That is, conduit 3 is brought into communication with chamber 1 through the valve assembly 5 to bring the nuclei-bearing samples into the chamber. The instrument performs the same operational sequence described above with reference to the nuclei-free samples; i.e., flush, fill, dwell and expand, on the nuclei-bearing samples.

When the nuclei-bearing sample is being detected and measured the cam 21 operating in synchronism with the valve assembly 5 has moved into position to urge the contact element on the flexible armature 22 against contact 23 connecting the output lead 19 from the radiation sensitive device 18 to the peak voltmeter 25.

A signal proportional to the peak of the output voltage from the device 18 may be connected through an output terminal 27 to a meter or a recording device for providing an indication of the nuclei concentration in the sample.

Thus, to describe the operation of the apparatus of FIGURE 1, briefly, alternate nuclei-free and nuclei-bearing samples are supplied to the apparatus and expanded. The nuclei-free samples are then utilized to control a pressure-regulating means to maintain the expansion ratio at that value which produces a supersaturation level just below that necessary for spontaneous condensation. In the event ambient temperature and pressure conditions change in such a manner as to make the particular expansion pressure ratio too high, spontaneous condensation occurs producing an output signal which is utilized to control the electromechanical adjustable pressure-regulating means to reduce the expansion ratio to the proper value. Thus, the expansion ratio has always been compensated for prior to the application of nuclei bearing gaseous samples to the expansion chamber, which sample represents the condition it is desired to measure with a high level of accuracy.

FIGURE 3 illustrates in detail a preferred embodiment of the expansion chamber 1, and the valve assembly 5 of FIGURE 1. The chamber 1 is divided into two portions 38 and 39 separated by means of a leakproof divider wall 40. Chamber 39 has inlet conduit 4 and the outlet conduit 12 connected thereto and is the actual expansion chamber while chamber 38 is an optical transmission chamber. As has been pointed out, the chamber means 1 is traversed by a beam of radiant energy to provide a means of measuring the droplet cloud density, to this end a so-called dark field illuminating system projects the beam of radiant energy through the chamber portions 38 and 39 so that it impinges upon the radiation sensitive device 18 only if a droplet cloud is present. An incandescent bulb 17, positioned adjacent one end of the chamber 1 produces radiant energy through the medium of a pair of condensing lenses 41 threadably mounted in the end of the chamber, is projected through chamber 38 and focussed at the divider wall 40. Fastened to the divider wall 40 is a lens 42 which acts as an apparent source and projects the beam onto a light transparent member 43 adjacent the radiation sensitive device 18 and threadably mounted in the other end of the chamber 1.

Positioned on the face of the light transparent member 43 is an opaque barrier member 45 mounted by means of a number of strut elements 46 which insures that there is no direct light transmission between the source of energy 17 and the radiation sensitive device 18. Thus, only light scattered by the presence of droplet clouds within the chamber impinge upon the radiation sensitive element 18. To insure that only such scattered light affects the radiation sensitive device, a second circular opaque member 47 is positioned on the face of one of the condenser lenses 41 blocking a portion of the beam of light generated by the radiant energy souce 17 to produce a dark field illuminating system. That is, a cone of light is produced subtending a given angle "$a$" containing therein a cone of darkness "$b$" subtending a second smaller angle but which latter angle "$b$" is of such a size that it has a larger cross sectional area than the opaque blocking member 45. In this fashion there is no impingement of light on the radiation sensitive device 18 in the absence of droplet clouds. However, upon the appearance of such a droplet cloud light is scattered in the angular volume, illustrated as the dappled or shaded portion, illuminated by the rays in the cone of light and intercepted by the field of view of the radiation sensitive device 18, which light impinges upon the device 18 to produce an electrical output.

The valve assembly 5 consists of a hollowed stator portion 6 having a number of ports to which the respective conduits 2, 3, 4, 12 and 13 are connected. Positioned within the stator 6 is a rotor 7 having a number of recessed portions positioned to produce the desired valving action. Thus, the rotor 7 contains at its left hand end a pair of diametrically positioned, axially displaced, partially overlapping recessed portions 48 and 49 constituting portion A of the valve which connects the conduits 2 and 3 selectively to the inlet conduit 4. That is, during the first 180° of rotation the recessed portion 48, as best seen in FIGURES 3 and 4, comes into alignment with the conduits 2 and 4 permitting flow of nuclei-free samples into the chamber portion 39. The recessed portion 49 being diametrically positioned relative to 48 is, of course, out of communication with its respective conduits as can be seen most clearly in FIGURE 5. 180° later recessed portion 49 has rotated into position to bring conduits 3 and 4 into communication introducing nuclei-bearing gaseous samples into the chamber. The overlapping construction of the recesses 48 and 49 permit the use of the common inlet conduit 4 which communicates with only one of the conduits 2 or 3 at a time.

Axially displaced from the recessed portions 48 and 49 is that portion of the rotor member which, in conjunction with the conduits 12 and 13, constitutes portion B of the valve assembly 5. A cylindrical recessed portion 50 milled out of the rotor 7 is in juxtaposition and constant communication with the output conduit 13. Communicating with the recessed portion 50 are a pair of axially extending, diametrically positioned V-shaped notches 51 and 52 each of which communicates in turn with a diametrically positioned, slotted, circumferential portion 53 and 54, axially positioned along the rotor to come into periodic communication with the conduit 12.

Thus, conduit 12, as can be seen most clearly with reference to FIGURE 7, communicates with the conduit 13 through the V-shaped notch 52, the restricted portion 53 during one-half of the rotational cycle, and through the corresponding pair of elements 51 and 54 during the remaining half. Thus, whenever the V-shaped notches 51 and 52 are in alignment with conduit 12, during the expand portions of the respective samples, the full pressure differential from the pump 15, and the pressure-regulating valve 14 is applied to the chamber through conduit 13. During the flush and fill portions the slotted members 53 and 54 are in alignment with conduit 12 and permitting restricted flow out of the chamber. When the rotor 7, illustrated in FIGURE 7 as a butterfly-shaped section, rotates into alignment with conduit 12, during the dwell portion, the expansion chamber is isolated from the pump 15 and the sample in the chamber comes to thermal equilibrium.

In describing the construction and operation of the condensation nuclei apparatus a particular type of electromechanical pressure-regulating valve has been described. It is, of course, obvious to the man skilled in the art that many variations of the solenoid operated valve assembly may be utilized without departing from the spirit of the invention.

Also, it must be realized of course that instead of a solenoid operated, armature actuated, valve assembly it is perfectly possible to utilize a motor driven regulator valve, as well as other similar devices.

In addition, the particular valve assembly 5 illustrated and described with reference to FIGURE 3, while a preferred embodiment, is not the only one which may be utilized. That is, many variations of the configuration may be devised and are prefectly obvious to the man skilled in the art. All that is required is a valve which performs the desired functions described above of introducing successive samples of nuclei-free and nuclei-bearing samples and subjecting each of them to the prescribed operational sequence.

Furthermore, applicant has disclosed a single expansion chamber which has the nuclei-free and nuclei-bearing samples introduced thereto alternately in order to produce the desired result. It is again obvious that rather than using a single chamber with a valving system to introduce the samples alternately, two such chambers may be utilized; one for the nuclei-free and the other one for the nuclei-bearing gaseous samples. The manner in which the circuitry and the instrumentalities would have to be adjusted in order to utilize this type of system is quite clear once it is understood that this alternate construction may be utilized.

From the foregoing description, it can be appreciated that the instant invention provides a nuclei measuring apparatus in which gaseous samples are subjected to a very high pressure expansion ratio, one just below that necessary to produce spontaneous condensation, wherein variations in the ambient temperature and pressure conditions are continuously adjusted for.

While a particular embodiment of this invention has been shown it will, of course, be understood that many modifications both in the circuit arrangement and in the instrumentalities employed may be made. It is contemplated by the appended claims to cover any such modifications which fall within the true spirit and scope of this invention.

What I claim as new and desire to secure by Letters Patent of the United States is:

1. In a condensation nuclei measuring device, the combination comprising a chamber means adapted to hold gaseous samples, means coupled to said chamber to reduce the pressure in said chamber to expand said samples periodically to form droplet clouds about the nuclei in said samples, means to measure the droplet cloud density formed in said samples and produce an electrical signal in response thereto, and pressure control means adapted to receive the electrical signal representative of the droplet cloud density, said control means including means responsive to the magnitude of said electrical signal to vary the expansion pressure applied to the samples in said chamber continuously to compenste for ambient temperature and pressure conditions.

2. In a high expansion ratio condensation nuclei measuring device, the combination comprising a chamber defining means adapted to hold gaseous samples, means coupled to said chamber to introduce nuclei-bearing and nuclei-free gaseous samples alternately, means to reduce the pressure periodically in said chamber to expand said samples and form droplet clouds by condensation about any nuclei present, said means normally bringing said pressure reduction to a magnitude just less than that necessary to produce spontaneous condensation, means to measure the droplet cloud density for each of said samples, and means to control said pressure reducing means in response to the density of droplet clouds formed in said nuclei free samples by deviation produced spontaneous condensation to adjust continuously the magnitude of said pressure reduction to compensate for ambient temperature and pressure variations.

3. In a high expansion ratio condensation nuclei measuring device, the combination comprising a chamber defining means adapted to hold gaseous samples, means coupled to said chamber to introduce nuclei-bearing and nuclei-free samples alternately, means to reduce the pressure in said chamber periodically to expand said samples and form droplet clouds by condensation about any nuclei including an adjustable pressure-regulating means, said pressure being of a magnitude just less than that necessary to produce spontaneous condensation, means to measure the droplet cloud density for each of said samples, and means responsive to the formation of droplet clouds in said nuclei-free sample due to spontaneous condensation to control said pressure-regulating means whereby ambient temperature and pressure conditions are compensated for.

4. In a high expansion ratio condensation nuclei measuring device, the combination comprising a chamber defining means adapted to hold gaseous samples, means coupled to said chamber to introduce alternately nuclei-bearing and nuclei-free samples, means to reduce the pressure in said chamber to a magnitude just less than that necessary to cause spontaneous condensation coupled to said chamber and adapted for connection to a source of low pressure, said means including an adjustable pressure-regulating means, means to produce electrical outputs proportional to the droplet cloud density for each of said samples, and means responsive to the electrical output representative of the nuclei-free samples to control said pressure-regulating means.

5. In a high expansion ratio condensation nuclei measuring device, the combination comprising a chamber adapted to hold gaseous samples, means to form a beam of radiant energy adapted to traverse said chamber, to introduce alternately nuclei-bearing and nuclei-free gaseous samples, means coupled to said chamber and adapted for connection to a source of low pressure to reduce the pressure in said chamber to that value just short of producing spontaneous condensation, said means including an adjustable electromechanical pressure-regulating means, means including a radiation sensitive device to produce output voltages proportional to the droplet cloud density in each of said samples, reference voltage means, and means to compare said reference and the output voltages representative of said nuclei-free samples and control said pressure-regulating means.

6. In a high expansion ratio condensation nuclei measuring device, the combination comprising means to produce a beam of radiant energy, a chamber adapted to hold gaseous samples and traversed by said beam of radiant energy, means coupled to said chamber to introduce alternately nuclei-bearing and nuceli-free gaseous samples, means coupled to said chamber and adapted for connection to a source of low pressure to reduce the pressure in said chamber to that value just short of producing spontaneous condensation, said means including an adjustable electromechanical pressure-regulating means, a radiation sensitive device positioned adjacent to one end of said chamber to produce output voltages proportional to the droplet cloud densities, first and second voltage measuring means, switch means to connect said radiation sensitive means selectively to said first and second voltage measuring means to measure the voltages representative of nuclei-free and nuclei-bearing samples respectively, reference voltage means coupled between said reference voltage source and one of said voltage measuring means to compare said voltages and control said pressure-regulating means whereby ambient pressure and temperature variations are compensated for.

References Cited in the file of this patent

UNITED STATES PATENTS

| | | |
|---|---|---|
| 2,486,622 | White | Nov. 1, 1949 |
| 2,684,008 | Vonnegut | July 20, 1954 |
| 2,829,363 | Obermaier et al. | Apr. 1, 1958 |
| 2,876,364 | Goody | Mar. 3, 1959 |